United States Patent [19]
Wareham

[11] Patent Number: 5,602,339
[45] Date of Patent: Feb. 11, 1997

[54] INJECTION MOLDING MACHINE PRESSURE TRANSDUCER WITH TRAPEZOIDAL CAVITY

[75] Inventor: William Wareham, Marion, Mass.

[73] Assignee: Dynisco, Inc., Sharon, Mass.

[21] Appl. No.: 496,418

[22] Filed: Jun. 29, 1995

Related U.S. Application Data

[63] Continuation-in-part of Ser. No. 217,645, Mar. 24, 1994, Pat. No. 5,440,932.

[51] Int. Cl.⁶ ............................................. G01L 7/02
[52] U.S. Cl. ............................ 73/730; 73/705; 250/227.21
[58] Field of Search ........................ 425/149; 250/227.21, 250/231.19; 73/705, 708, 729.1, 729.2, 753, 730

[56] References Cited

U.S. PATENT DOCUMENTS

| | | |
|---|---|---|
| 3,014,368 | 12/1961 | Musser et al. . |
| 3,128,628 | 4/1964 | Lebow . |
| 3,149,492 | 9/1964 | Weinberg . |
| 3,698,248 | 10/1972 | Vasek . |
| 3,767,339 | 10/1973 | Hunkar . |
| 4,030,177 | 6/1977 | Hold . |
| 4,102,210 | 7/1978 | Couston et al. . |
| 4,109,147 | 8/1978 | Heske . |
| 4,218,926 | 8/1980 | DeVisser . |
| 4,262,529 | 4/1981 | Rosenblatt et al. . |
| 4,391,147 | 7/1983 | Krempl et al. . |
| 4,404,854 | 9/1983 | Krempl et al. . |
| 4,429,570 | 2/1984 | Tinder . |
| 4,576,049 | 3/1986 | Kohnlechner . |
| 4,699,004 | 10/1987 | Evans et al. . |
| 4,706,501 | 11/1987 | Atkinson et al. . |
| 4,763,527 | 8/1988 | Raftis . |
| 4,807,477 | 2/1989 | Myers et al. . |
| 4,807,479 | 2/1989 | Sako et al. . |
| 4,835,717 | 5/1989 | Michel et al. . |
| 4,840,068 | 6/1989 | Mayhew, Jr. . |
| 4,884,452 | 12/1989 | Kaiser . |
| 4,925,619 | 5/1990 | Sparrow et al. . |
| 4,932,263 | 6/1990 | Wlodarczyk . |
| 4,938,068 | 7/1990 | Clements . |
| 4,961,696 | 10/1990 | Yamamura . |
| 4,982,607 | 1/1991 | Betterton et al. . |
| 5,022,271 | 6/1991 | Hannon, Jr. . |
| 5,024,099 | 6/1991 | Lee . |
| 5,031,460 | 7/1991 | Kanenobu et al. . |
| 5,042,307 | 8/1991 | Kato . |
| 5,138,155 | 8/1992 | Gray . |
| 5,472,331 | 12/1995 | Watkins ................................ 425/149 |

FOREIGN PATENT DOCUMENTS 4-4117  1/1992  Japan .

Primary Examiner—Richard Chilcot
Assistant Examiner—Joseph L. Felber
Attorney, Agent, or Firm—Wolf, Greenfield & Sacks, P.C.

[57] ABSTRACT

An in-line pressure transducer includes a body and an inner ring, coupled to the body, through which molten material flows. The inner ring expands in response to pressure from the molten material. An outer ring is located coaxially with the inner ring. At least one flexure connects the inner and outer rings. The flexures translate expansion of the inner ring to the outer ring. The body includes a cavity within which the outer ring is located. The cavity preferably has a cross-sectional shape that is trapezoidal in order to compensate for lateral displacement of the transducer in response to axial forces exerted thereon during operation.

37 Claims, 7 Drawing Sheets

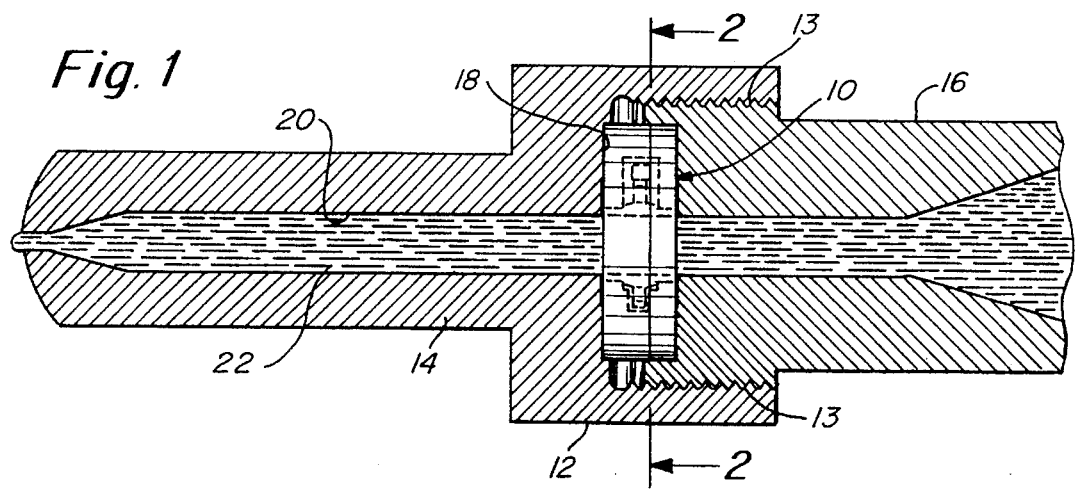
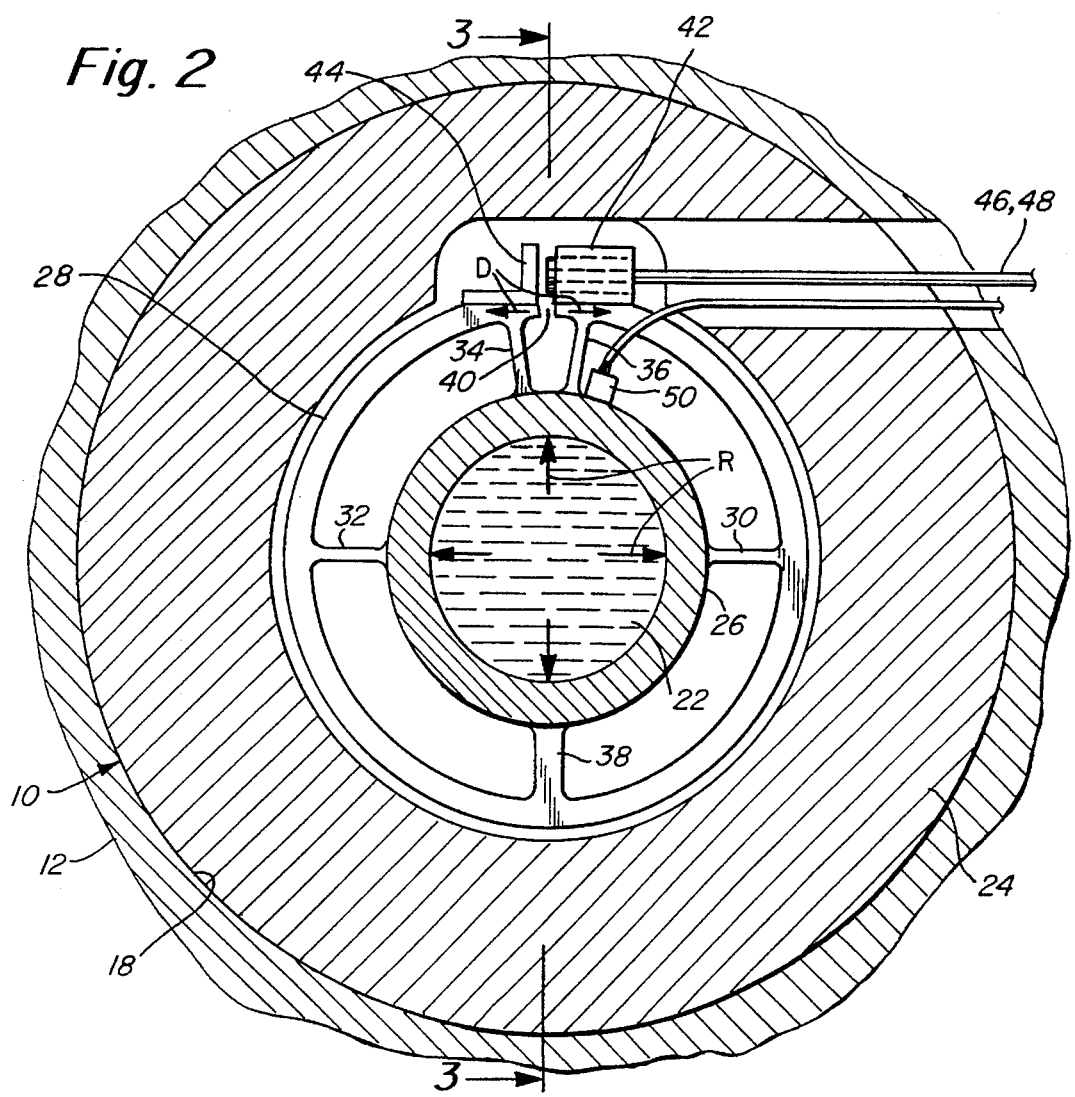

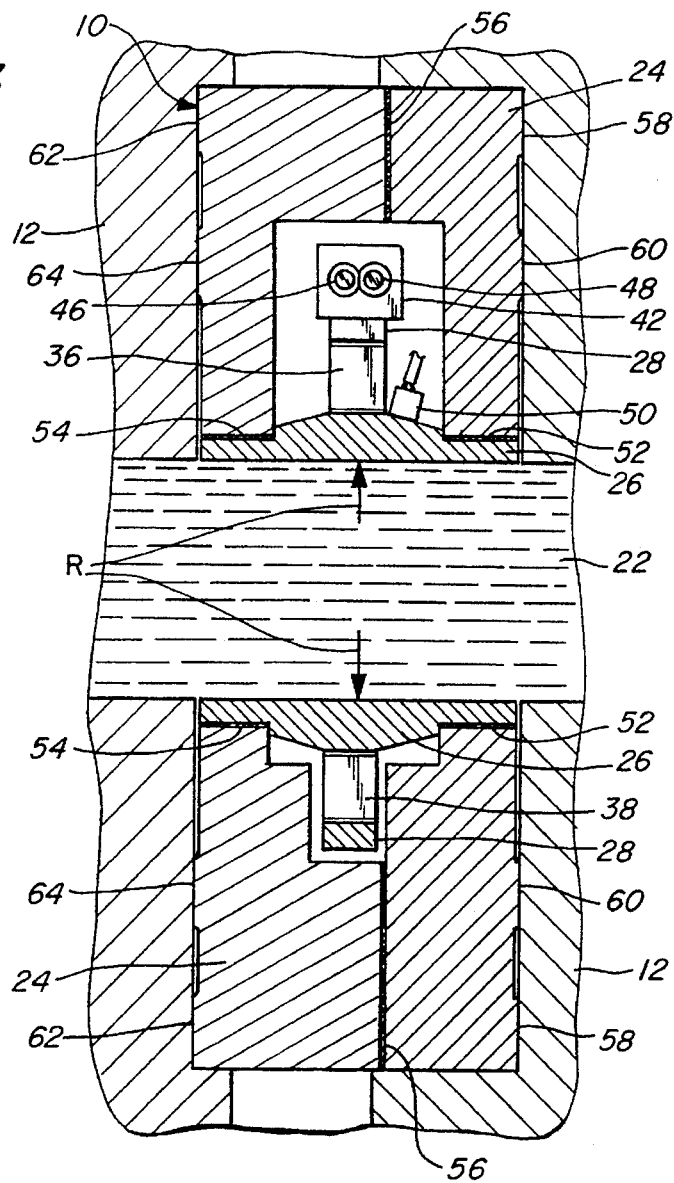
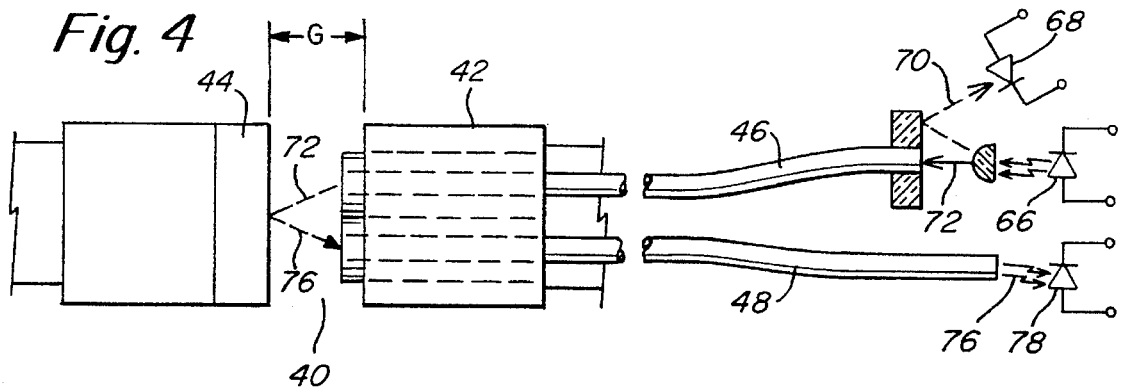

INJECTION MOLDING MACHINE PRESSURE TRANSDUCER WITH TRAPEZOIDAL CAVITY

RELATED APPLICATIONS

The present application is a continuation-in-part of application Ser. No. 08/217,645 filed Mar. 24, 1994, now U.S. Pat. No. 5,440,932.

BACKGROUND OF THE INVENTION

1. Field of the Invention

The present invention relates generally to pressure transducers and pertains, more particularly, to in-line pressure transducers.

2. Discussion of Related Art

Injection molding machines are used to manufacture plastic and metal parts. Injection molding machines typically include a reservoir of molten plastic and a nozzle through which the molten plastic is forced at high pressures into a mold. The plastic is thereafter packed and cooled to form a part. In the manufacture of such parts, it is desirable to maintain the injected melt pressure constant so that the part is formed accurately. Without maintaining the pressure constant, the structural accuracy of the formed part may suffer. For example, the resulting part may include voids, ripples, or other dimensional inaccuracies.

As such, there is a need for pressure transducers which can accurately measure the pressure of molten plastic as it is forced from the tip of an injection molding machine. Because of the operating parameters of injection molding machines, pressure transducers used therein must be able to measure pressure accurately while withstanding pressures within the range of 40,000–50,000 psi and temperatures up to approximately 500° C. Additionally, such pressure transducers are faced with the following constraints: 1. the pressure transducer should have low working stresses to avoid metal fatigue cracking under repetitive cyclic loading; 2. the pressure transducer, for economic practicality, should be physically arranged such that it can easily be integrated within the chamber/nozzle area of injection molding machines; and 3. the pressure transducer should not disrupt the plastic flow or have pockets where plastic will remain and eventually degrade and cause staining of the parts.

Accordingly, a general object of the present invention is to provide an injection molding machine pressure transducer which can accurately measure pressures of molten plastic within such machines.

A further object of the present invention is to provide an injection molding machine pressure transducer which is easily integratable with existing injection molding machines.

SUMMARY OF THE INVENTION

To accomplish the foregoing and other objects, features and advantages of the present invention, there is provided a pressure transducer that includes a body and an inner ring, coupled to the body, through which molten material flows. The inner ring expands in response to pressure from the molten material. An outer ring is disposed coaxially with the inner ring. At least one flexure connects the inner and outer rings. The flexures translate expansion of the inner ring to the outer ring. The body includes a cavity within which the outer ring is located. In one embodiment, a cross-section of the cavity is trapezoidal in shape. In that embodiment, the body has tapered sidewalls which define the cavity.

The transducer further includes a housing, attached to the body, that encloses the cavity. In one embodiment, an outer surface of the inner ring defines the inner wall of the cavity and an inner surface of the housing defines the outer wall of the cavity, wherein the outer wall is longer than the inner wall. The body preferably is integral with the inner ring. Also, the housing preferably is brazed to the body.

In one embodiment of the invention, the pressure transducer is attached to the nozzle of an injection molding machine wherein the nozzle of the injection molding machine includes first and second members through which molten material flows. The second member is located downstream of the first member. The transducer includes a hollow body, disposed between the first and second members, through which the molten material flows. The hollow body is attached to the second member. A housing is attached to the body and to the first member. A pressure sensing mechanism, coupled to the body, senses pressure of the molten material.

Preferably, the body is threaded onto the second member and the housing is threaded onto the first member. Also, the housing preferably is brazed to the body.

The body preferably has a longitudinal length between the first and second members that is greater than a cross-sectional diameter of the body.

In another embodiment of the invention, the pressure transducer includes a body and an inner ring, coupled to the body, through which molten material flows. The inner ring expands in response to pressure exerted thereon by the molten material. An outer ring is coaxially disposed about the inner ring. A plurality of flexures of varying thicknesses connect the inner and outer rings. The flexures translate expansion of the inner ring to the outer ring.

Preferably, the outer ring includes an opening and the thicknesses of the flexures increase as the distances of the flexures from the opening along the circumference of the outer ring increase. The flexures preferably are symmetrically disposed about the opening.

The transducer includes an anchor flexure that is disposed substantially diametrically opposite the opening. The anchor flexure preferably is the thickest flexure.

In an alternate embodiment of the invention, the transducer includes at least one continuous flexure member that connects the inner and outer rings in a plurality of circumferential locations. The flexure translates expansion of the inner ring to the outer ring. Preferably, the continuous flexure is serpentine-like.

The invention also includes a method for forming a pressure transducer that includes the following steps: (a) providing a body; (b) forming a hollow inner ring, coupled to the body, through which molten material flows, such that the inner ring will expand in response to pressure from the molten material; (c) defining a cavity within the body; (d) disposing an outer ring within the cavity that is coaxial with the inner ring; and (e) connecting the inner and outer rings with at least one flexure that will translate the expansion of the inner ring to the outer ring.

The step of defining preferably includes defining a cavity with a trapezoidal-shaped cross-section.

The method may include the further step of attaching a housing to the body that encloses the cavity.

In one embodiment, the step of connecting includes connecting a plurality of flexures having varying thicknesses. In another embodiment, the step of connecting includes connecting at least one continuous flexure that contacts the inner and outer rings in multiple circumferential locations.

BRIEF DESCRIPTION OF THE DRAWINGS

Numerous other objects, features and advantages of the invention will now become apparent to those skilled in the art upon a reading of the following detailed description taken in conjunction with the accompanying drawings, in which:

FIG. 1 is a cross-sectional view of the pressure transducer of the present invention retained within the nozzle of an injection molding machine;

FIG. 2 is a cross-sectional view taken along lines 2—2 of FIG. 1 illustrating components of the pressure transducer;

FIG. 3 is a cross-sectional view taken along lines 3—3 of FIG. 2 showing further details of the components of the pressure transducer;

FIG. 4 is a block diagram of the optical arrangement of the displacement sensor of the pressure transducer;

DETAILED DESCRIPTION

In accordance with the present invention there is provided a pressure transducer for use in an injection molding machine. The pressure transducer is secured within a bore of a nozzle of an injection molding machine and includes an inner stress tube ring through which the molten plastic of the injection molding machine flows. An outer ring having an opening is coaxial with the inner stress tube ring and is attached thereto by at least one flexure. The stress tube radially expands in response to pressure from the molten plastic and the expansion is translated to the outer open ring by the flexures.

As pressure is applied to the melt, the opening of the outer ring widens such that both sides of the opening displace with respect to one another. The displacement is determined by a displacement sensor. This displacement is directly proportional to the pressure of the molten plastic. The pressure is therefore calculated from the amount of displacement.

Figure 5:
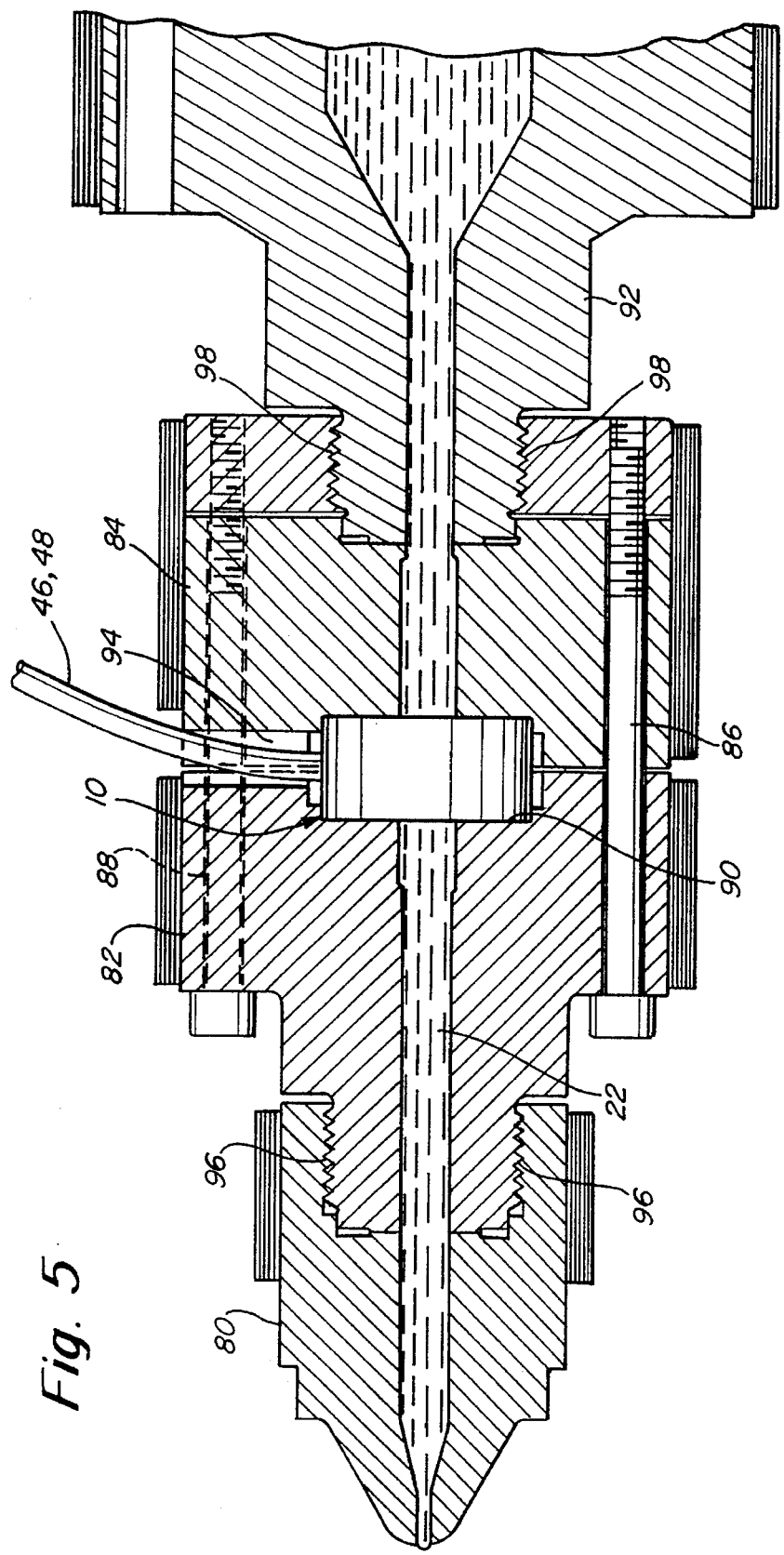
FIG. 5 is a cross-sectional view of an alternate embodiment of the pressure transducer shown mechanically retained within the nozzle of an injection molding machine.

Reference is now made to the drawings and in particular to a first embodiment of the pressure transducer illustrated in FIG. 1 within a bore of a nozzle of an injection molding machine. FIGS. 2 and 3 illustrate further details of the components of the pressure transducer. FIG. 4 illustrates a preferred optical displacement sensor arrangement. FIG. 5 shows an alternate embodiment of the pressure transducer within a nozzle of an injection molding machine. FIGS. 6, 8, 9 and 10 illustrate details of a further alternate transducer embodiment in which a cavity is formed in the transducer body for accuracy improvement. FIGS. 7 and 11 show alternate flexure arrangements.

FIG. 1 illustrates the pressure transducer 10 retained within the bore 18 of nozzle 12 of an injection molding machine. The pressure transducer 10 is mechanically retained with the bore 18 between outer nozzle piece 14 and inner nozzle piece 16 of nozzle 12 of the injection molding machine. The outer nozzle piece 14 and inner nozzle piece 16 include interengaging threads 13 such that inner nozzle piece 16 can be threaded onto outer nozzle piece 14 and the pressure transducer is sealed therebetween. Molten plastic 22 flows through canal 20 of the injection molding machine. Pressure transducer 10 is concentric about canal 20 and the molten plastic 22 flows through pressure transducer 10. The pressure transducer 10 measures the pressure of the molten plastic 22.

Pressure transducer 10 is shown in cross-section in FIG. 2. As shown, pressure transducer 10 includes a housing 24, an inner stress tube 26, through which the molten plastic 22 flows, and an outer open ring 28 that is coaxial and concentric with inner stress tube 26. Outer open ring 28 is connected to inner stress tube 26 through flexures 30, 32, 34, and 36, and anchor support flexure 38. Anchor flexure 38 is approximately located diametrically opposite the opening 40 of the outer ring 28.

During operation, the inner stress tube ring 26 deflects or expands radially (shown by the arrows R) in response to pressure from molten plastic 22. This radial deflection or expansion is translated to the outer open ring 28 by the flexures 30, 32, 34, 36 and 38. When the stress tube expansion is translated to the outer ring through the flexures, the opening 40 of the outer ring 28 widens with the anchor flexure acting as a fulcrum (as illustrated by arrows D). Because the outer ring includes an opening and is coaxial with the inner ring, the circumferential displacement of the outer ring is concentrated at the opening and is amplified by approximately $2\pi$ times the radial displacement of the inner stress tube. This open-ring arrangement, which causes the amplification of radial expansion, provides advantages in the area of accuracy and longevity of the pressure transducer, as will be described in greater detail hereinafter.

The pressure of the molten plastic is directly proportional to the radial expansion of the inner stress tube. Thus, the outer ring opening displacement is proportional to the pressure of the molten plastic.

A displacement sensor 42 determines the opening displacement which, in turn, is used to calculate the pressure. Displacement of the outer open ring about the opening 40 is directly proportional to the radial expansion of the inner stress tube. Displacement sensor member 42 is attached to outer open ring on one side of the opening and mirrored bracket 44 is attached to the outer open ring on the other side of the opening. Operation of the displacement sensor 42 is described below.

Temperature sensor 50 is provided at the surface of the stress tube 26 to determine the operating temperature of the transducer and to provide temperature offset compensation.

Flexures 30–38 translate the radial expansion from the stress tube 26 to the outer ring 28. The flexures may be axially rigid to translate the expansion with minimum deflection. In addition, the flexures may be circumferentially or laterally flexible allowing the opening 40 to widen. As greater circumferential displacement occurs closer to the opening of the ring, the flexures near the opening should be more flexible to accurately translate the expansion. By contrast, the anchor flexure, which for the most part acts as a fulcrum, should be more structurally rigid. The inner stress tube radial expansion is magnified at the opening 40 by approximately $2\pi$. For a stress tube radial deflection of 0.0008 inches, a gap opening of approximately 0.005 inches occurs.

Further details of the pressure transducer 10 are illustrated in cross-section in FIG. 3. As illustrated, the inner stress tube ring 26 preferably is brazed to transducer housing 24 at copper braze joints 52 and 54. The transducer housing 24 includes two pieces which also preferably are brazed together at copper braze joint 56. The housing body preferably is made from stainless steel and is designed such that the transducer can withstand high axial pressure from the nozzle. Contoured feet 58, 60, 62 and 64 are provided in transducer housing 24 to aid in the mechanical retention and sealing of the transducer within the bore and to the nozzle 12. The contoured feet provide a metal to metal seal and also provide mechanical rigidity. As shown, inner stress tube ring 26 directly contacts molten plastic 22. Pressure transducer 10 is heat sensitive. Therefore, temperature offset calibration also is performed on the transducer. Temperature sensor 50 senses the temperature of the transducer and a feedback arrangement (not shown) is used to provide electronic thermal zero compensation to alter the characteristics of the transducer based on temperature changes sensed by sensor 50. Accordingly, zero shift temperature characteristic information is determined for the transducer and used to compensate for the temperature offset by the temperature feedback and compensation circuitry. Additionally, the transducer is calibrated during initial tests when known accurate pressures are applied to the transducer and the displacement of the opening is thereafter measured. For different temperatures, the relationship between the pressure and the displacement that occurs is determined so that temperature effects can be minimized.

The design of the transducer is fundamentally simple which offers certain advantages. For example, the stress tube, flexures and outer ring can be machined from a single piece of metal or separate pieces and then copper brazed and/or welded together to complete the mechanical assembly. Because the inner stress tube is stiff and includes the motion-amplified outer ring coaxial therewith, the transducer itself provides low stress with ample deflection which aids in the longevity of the transducer. In the arrangement shown in FIG. 1, the transducer is an "in-line" transducer in which no drilled holes are provided which penetrate the bore and the molten plastic is not re-routed from its normal flow route. Therefore, the bore remains clean so as to not alter any pressure characteristics of the injection molding machine. In addition, because the pressure transducer is located at the nozzle of the injection molding machine, the pressure is determined at the point just before the molten plastic is injected into the mold which is desired.

FIG. 4 is a block diagram illustrating a preferred arrangement of the displacement sensor 42. This arrangement is an optical fotonic arrangement including an input optical fiber 46 and an output optical fiber 48. An LED (light emitting diode) 66 generates light, a small portion 70 of which is reflected to the photodetector 68. The remainder of the light produced is inputted into the input optical fiber 46 as an input light ray 72. Photodetector 68 determines the level of the reflected ray 70, the desired level of which is predetermined.

A feedback arrangement (not shown) is provided between photodetector 68 and LED 66 such that if the intensity of the reflected ray 70 lessens, more power is provided to LED 66 to compensate for the decrease in light output. Input ray 72 runs through input optical fiber 46 and reflects off of mirrored bracket 44. The incident light intensity is dependent upon the gap G or the displacement of the outer open ring about the opening 40. A portion 76 of the reflected ray is outputted to output optical fiber 48 and is detected by photodetector 78. The intensity of the reflected ray 76 is directly proportional to the displacement of the outer open ring about the opening 40. By measuring the intensity of the reflected ray, therefore, the displacement is determined.

While this preferred embodiment of the displacement sensor includes an optical arrangement, it should be appreciated that a displacement sensor could include any means by which the displacement is determined such as an interferometric laser arrangement, a capacitance device, an inductive device such as a linear variable-differential transformer(LVDT), or the like. Each of these devices would determine the displacement about the opening of the outer open ring.

FIG. 5 illustrates an alternate embodiment of the present invention in which the pressure transducer 10 is mechanically retained between two nozzle flanges 82 and 84 of the nozzle of an injection molding machine. In this embodiment nozzle flanges 82 and 84 are attached to one another by bolts 86 and 88. Bore 90 between the two flanges 82 an 84 is machined for housing the transducer 10. The optical fibers 46 and 48 are fed through an opening 94. The nozzle additionally includes nozzle tip 80 and adapter 92. Nozzle flange 82 is attached to nozzle tip 80 by screw threads 96. It should be appreciated, however, that this attachment could be attained by other mechanical retention means. Nozzle flange 84 is attached to nozzle component 92 by screw threads 98. This embodiment provides the advantage that the nozzle pieces including nozzle tip 80, nozzle flanges 82 and 84, and adapter 92 are all modular and are secured together easily such that the transducer 10 is retained therein.

One distinct advantage offered by the present invention, is that the pressure transducer 10 can be retro-fitted within existing injection molding machines by simply providing a bore between two attaching pieces of the nozzle thereof. An alternate embodiment, not shown in the drawings, includes adding an adaptor piece to a nozzle of an injection molding machine which may be threaded or otherwise attached between an existing nozzle and an injection molding barrel. The adapter includes the pressure transducer of the present invention therein. This adapter may be manufactured from the same single piece of metal from which the pressure transducer housing is manufactured or, alternatively, the pressure transducer may be retained within the adapter through mechanical retention or the like.

Figure 6:
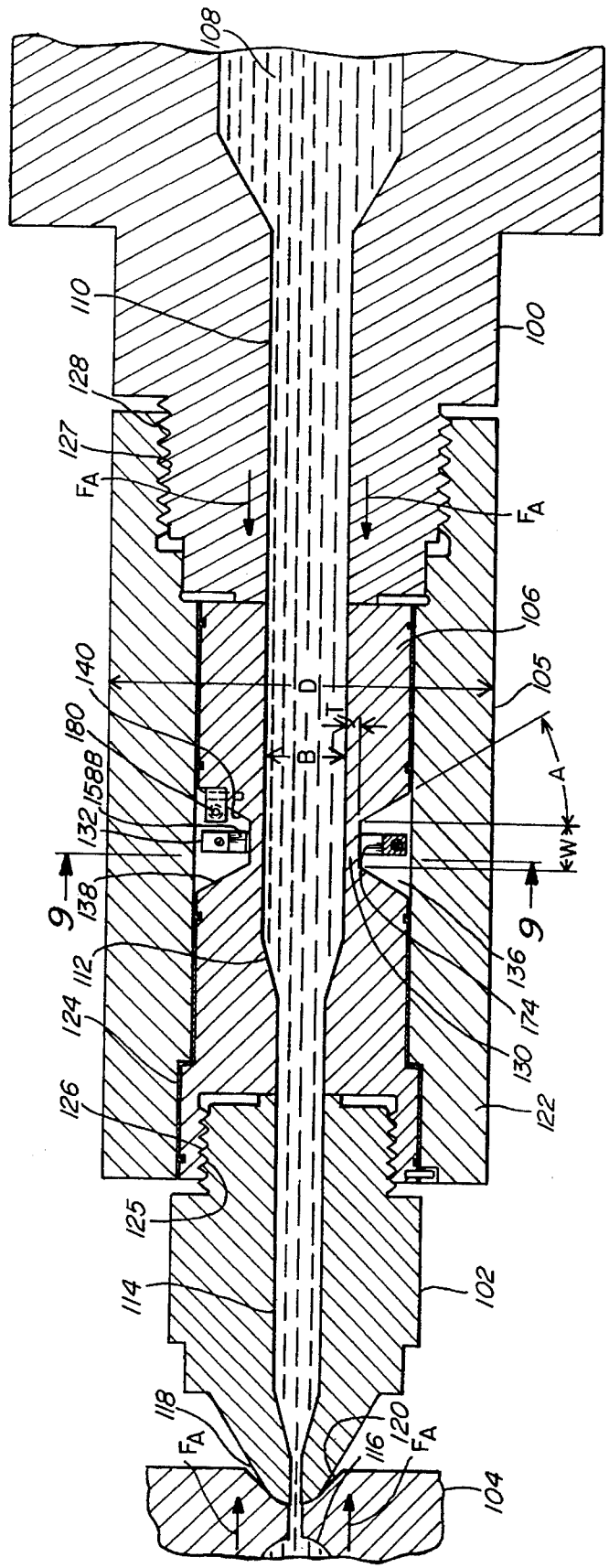
FIG. 6 is a cross-sectional view of an alternate embodiment pressure transducer of the present invention retained within the nozzle of an injection molding machine.
Figure 7:
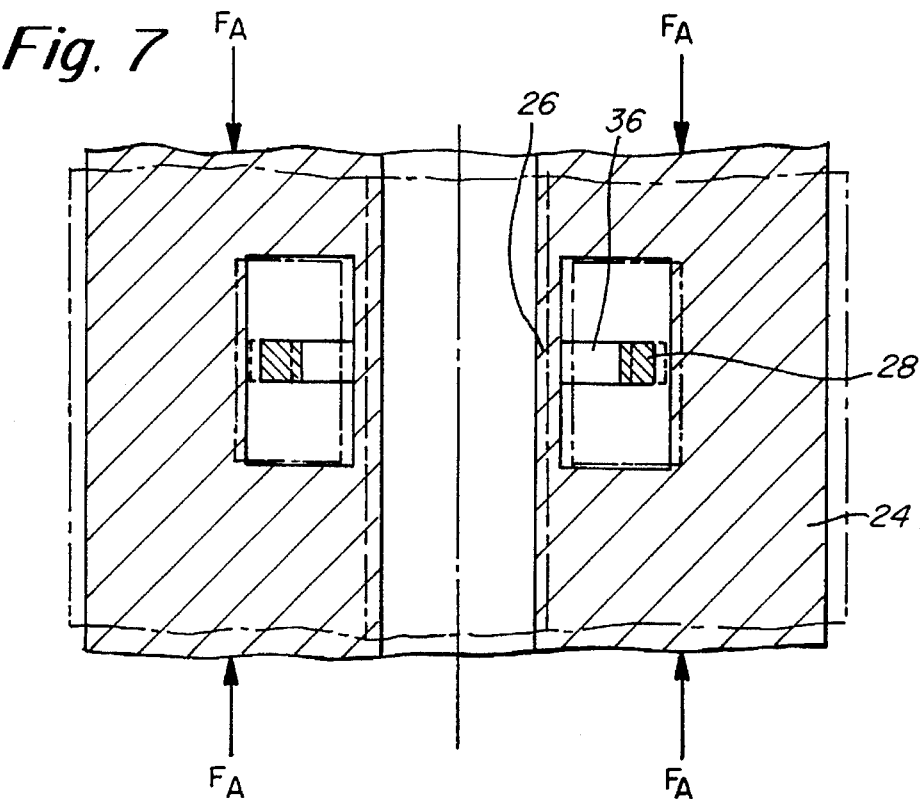
FIG. 7 is a partial cross-sectional view of the pressure transducer of FIG. 1 illustrating the axial force on the transducer and the displacement of the transducer in response to such force.

FIG. 6 is a cross-sectional view of an alternate embodiment pressure transducer secured within the nozzle of an injection molding machine. As will be described in greater detail below with reference to FIGS. 7 and 8, the structure of the transducer of FIG. 6 provides compensation for the lateral displacement of the transducer elements in response to axial forces thereon during operation. The body of the transducer is formed with a cavity of predetermined shape that provides such displacement compensation.

A cross-section of the nozzle of an injection molding machine is shown in FIG. 6 including a first nozzle member 100 and a second nozzle member 102. The second nozzle member 102 is located downstream of the first nozzle member 100. Also shown is the mold 104 against which the tip 118 of the injection molding machine is forced during use. The pressure transducer 105 is connected between the nozzle members 100 and 102. The pressure transducer 105 includes a hollow body member 106. The first nozzle member 100, transducer body 106, second nozzle member 102 and mold 104 are all formed with central canal portions 110, 112, 114 and 116, respectively, that are aligned when the transducer is secured within the nozzle. Each canal portion may have portions with different diameters. The central canal, comprising all of the canal portions, tapers inwardly at a number of locations in the flow direction of the molten material. The molten material 108 of the injection molding machine flows through the central canal during operation.

The transducer also includes a housing 122 which is attached to the body 106 preferably by brazing at braze joints 124. The body includes threads 125 on a forward side thereof which interengage with threads 126 of nozzle member 102 for attachment of the body to nozzle member 102. The housing 122 similarly includes threads 127 that interengage with threads 128 of nozzle member 100 for attachment of the housing to nozzle member 100. In this manner, the transducer 105 is retained securely between nozzle members 100 and 102.

The transducer also includes an inner ring 130, integral with the body 106, that radially expands in response to pressure exerted thereon by the molten material 108. A number of flexures 134 (only two, 158B and 174, are shown in this cross-sectional view) connect the inner ring 130 to an outer ring 132 (see FIG. 9). The flexures 134 translate the radial expansion of the inner ring to the outer ring as in the prior embodiment. Also, the outer ring includes an opening about which the outer ring displaces during expansion translation. The displacement is measured as above-described and the pressure is calculated from the displacement measurement.

The body 106 is formed with a cavity 136 within which the flexures and outer ring 132 are located. The cavity 136 preferably has a trapezoidal cross-sectional shape, as shown. The cavity includes side walls 138 and 140 which are tapered such that they approach the straight radial direction of the flexure at an angle A. The outer surface of the inner ring 130 defines the inner wall of the cavity. The length of the inner wall of the cavity is shown by reference character W.

As will be described in greater detail below, the axial forces (shown by the four arrows $F_A$) cause radial displacement of the transducer elements. Particularly, in the embodiment shown in FIG. 3, the axial forces cause the outer ring to radially expand or displace which may cause measurement errors, as explained below. To compensate for such axial force-responsive displacement, the cavity 136, having the shape illustrated, is provided. The amount of compensation is related to the angle A and length W of the cavity. By knowing the diameter D of the housing 122, the thickness T of the inner ring 30, and the diameter B of the inner chamber 112 of the transducer body 106, the angle A and length W of the cavity can be determined to provide a suitable amount of outer ring force-responsive displacement compensation.

In the embodiment of the transducer shown in FIG. 3, the cavity within which the outer ring is located has a rectangular cross-sectional shape. As previously stated, due to the axial forces provided on the tranducer during operation, lateral radial displacement of the transducer occurs, which potentially can cause inaccurate readings. During operation, the nozzle 118 of the injection molding machine is forced against the portion 120 of the mold 104 at an axial force $F_A$ as high as 20,000 pounds. This force seals the nozzle against the mold to resist polymer leakage under high injection pressures. This axial force $F_A$ is in turn applied to both sides of the transducer, as shown by the arrows in FIG. 6. The axial force on the transducer can cause both zero and span errors in the resulting measurement.

The most potentially significant resulting error can be caused by the zero shift which is proportional to the magnitude of the applied axial force. This error is caused by the lateral outward displacement of the transducer body and outer ring in response to the axial force and its resulting axial displacement. Such a reaction can be characterized by Poisson's ratio which defines a relationship between axial and lateral displacement.

Shown in FIG. 7 is a cross-sectional view of a portion of the transducer of FIG. 3. Shown are the inner ring 26, outer ring 28 and a flexure 36, as well as the body 24. The rectangular-shaped cavity within which the outer ring is located also is shown. The solid lines represent the transducer in its at-rest state and the dotted lines represent the transducer's approximate displacement in response to the axial compression force $F_A$. As shown, in response to the axial compression force $F_A$, the transducer body radially (laterally) displaces outwardly. Similarly, the inner ring 26, flexure 36 and outer ring 42 displace radially outwardly. This outward radial displacement of the transducer can cause the zero shift error.

Figure 8:
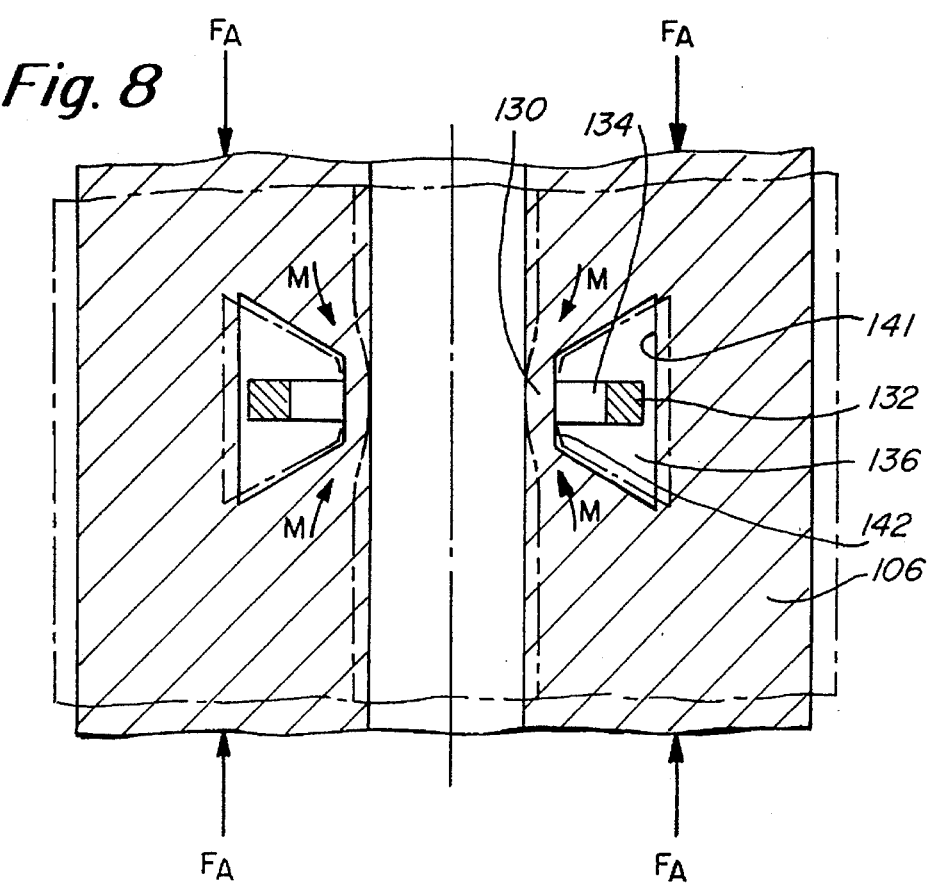
FIG. 8 is a partial cross-sectional view of the transducer of FIG. 6 illustrating the axial force on the transducer and the displacement compensation provided by the transducer.

FIG. 8 is a similar partial cross-sectional view of the transducer embodiment of FIG. 6. Shown in FIG. 8 are the transducer body 106, the inner ring 130, the outer ring 132, a flexure 134 and the cavity 136. By contrast with the square-shaped cross-sectional cavity of the embodiment of FIG. 7, the embodiment of FIG. 8 includes a cavity 136 with a trapezoidal cross-sectional shape. This trapezoidal cross-sectional shaped cavity provides for axial force-responsive radial displacement compensation.

Like FIG. 7, the solid lines show the transducer in its at-rest state while the dotted lines show the transducer as it is displaced in response to the axial force $F_A$. As shown by the dotted lines, in response to the axial force $F_A$, the housing 122 and cavity 136 radially displace outwardly. By contrast with the embodiment of FIG. 7, however, because the cavity has a trapezoidal cross-sectional shape, the inner ring 130 tends to buckle inwardly, thereby compensating for the radial displacement. Because of the buckling, the flexure 134 and outer ring 132 do not displace radially or do so very minimally, depending on the structural parameters of the cavity. The buckling causes an inward bending moment shown by the arrows labeled M.

Figure 9:
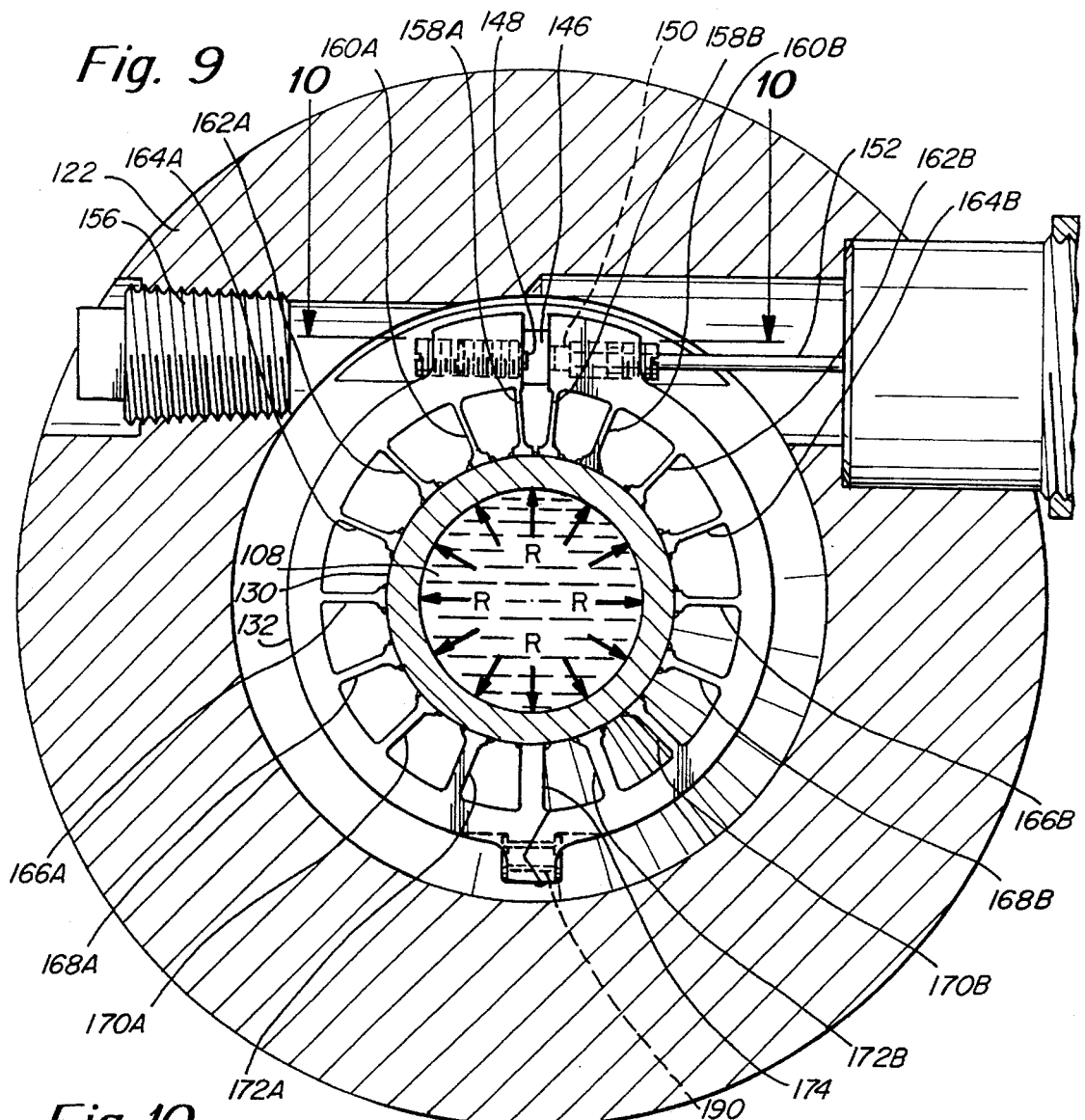
FIG. 9 is a cross-sectional view taken along lines 9—9 of FIG. 6 showing further components of the pressure transducer.

The length of the outer cavity wall 141 preferably is greater than the length W of the inner cavity wall 142. The angle A and length W are parameters of the cavity structure that are selected in response to the known dimensions D, T and B (shown in FIG. 6) of the transducer. The parameters of the cavity can also be preselected before finalization and use of the transducer in part based on trial and error so that maximum force-responsive radial displacement compensation is achieved. FIG. 9 is a cross-sectional view of one embodiment of the transducer taken along lines 9—9 of FIG. 6. As shown, the transducer includes inner ring 130, outer ring 132 and housing 122. The inner and outer rings are connected by a plurality of flexures 158A, 158B, 160A, 160B, 162A, 162B, 164A, 164B, 166A, 166B, 168A, 168B, 170A, 170B, 172A, 172B and 174. The flexures are circumferentially located between the inner and outer rings. Each flexure has a radial length and a thickness that is measured in a direction transverse to the radial length direction.

The outer ring includes an opening 146. The inner ring 130 radially expands in response to radial pressure (shown by arrows R) of the molten material 108. The radial expansion of the inner ring 130 is translated to the outer ring 132 by the flexures. The outer ring 132 displaces about the opening 146 with the anchor flexure 174 acting as a fulcrum. The thicknesses of the flexures increase as the circumferential distances of the flexures from the opening 146 increase. For example, the flexures 160A and 160B are thicker than the flexures 158A and 158B. Similarly, the flexures 162A and 162B are thicker than the flexures 160A and 160B, and so on. The flexures preferably are symmetrically disposed along a circumferential length of the rings. The anchor flexure 174 preferably is located approximately diametrically opposite opening 146.

As in the prior embodiment, during operation, when the outer ring expands about the opening, a sensing circuit measures the displacement about the opening. One such sensing circuit is an optical circuit that includes an optical fiber shown within sheath 152, an LED 150, connected to the outer ring on one side of the opening, and a mirror 148 connected to the outer ring on the other side of the opening. The transducer also includes a pipe plug 156, attached to the housing, that provides access to the mirror for adjustment thereof. Operation of the optical circuit is as described above.

The flexures preferably are brazed at their inner ends to the inner ring 130 and are integral at their outer ends with the outer ring 132. The use of more flexures (than the embodiment shown in FIG. 2) as well as the varying thicknesses of the flexures provide an increased natural frequency and improved response time of the transducer while maintaining accurate operation thereof.

The transducer illustrated in FIG. 2 includes five flexures and, as a result, the natural frequency of the transducer is relatively low. In other words, during operation, due to the relatively few flexures connecting the inner and outer rings, the outer ring 10 resonates at a relatively low frequency. Such resonation may result in measurement errors. When a member resonates at a low natural frequency, its radial displacement is relatively high compared to a similar structure with a higher resonant frequency. Thus, by including many more flexures which connect the inner and outer rings in the embodiment of FIG. 9, the transducer has more structural integrity and a higher resonant frequency results, thereby reducing potential measurement errors.

The thicknesses of the flexures preferably are varied and increase as the circumferential distances of the flexures from the opening increase. This is so because the displacement of the outer ring is greater near the opening than it is circumferentially further away from the opening. Thus, the required radial expansion translation from the inner ring to the outer ring is greater near the opening than it is further away from the opening. For example, the radial expansion translation that occurs 180° diametrically opposite the opening, by the anchor flexure 174, is close to zero and is the least of that caused by any of the flexures. By contrast, the radial expansion translation near the opening caused by the flexures 158A and 158B is the greatest of that caused by any of the flexures.

In order to achieve accurate radial expansion translation, flexures must be somewhat laterally flexible and elastic. Thus, a thinner flexure can tolerate a larger displacement than one of thicker cross section while maintaining lower operating stresses. Accordingly, the flexures closer to the opening are thinner than those further away from the opening along a circumferential direction. However, a thinner flexure tends to reduce the natural resonant frequency of the transducer as structural integrity is reduced with a thinner flexure. Thus, flexure thickness can be increased as circumferential distance from the opening is increased to increase response frequency.

Figure 10:
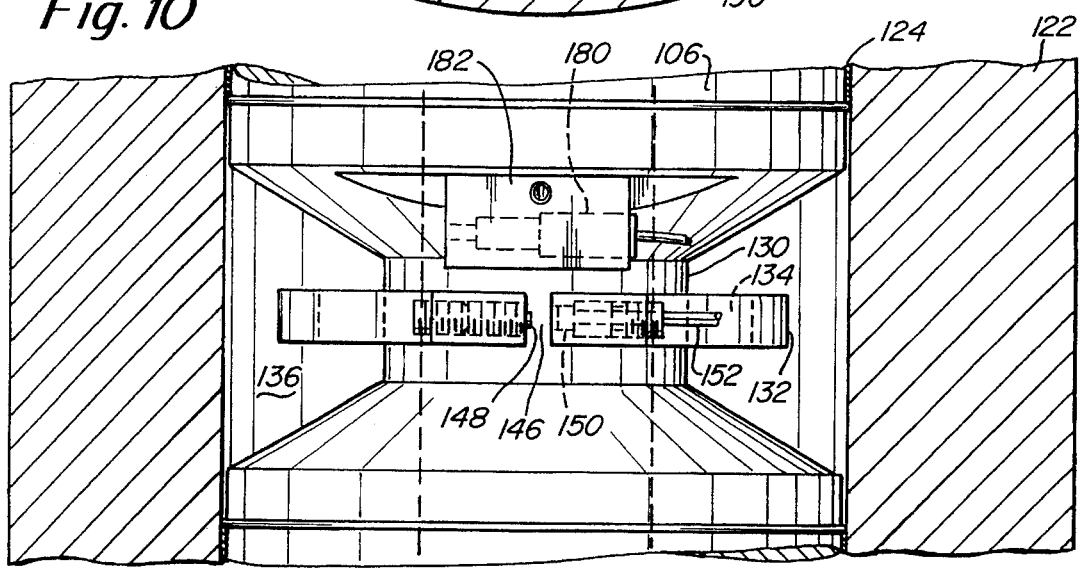
FIG. 10 is a cross-sectional view taken along lines 10—10 of FIG. 9 showing further details of the components of the pressure transducer.
Figure 11:
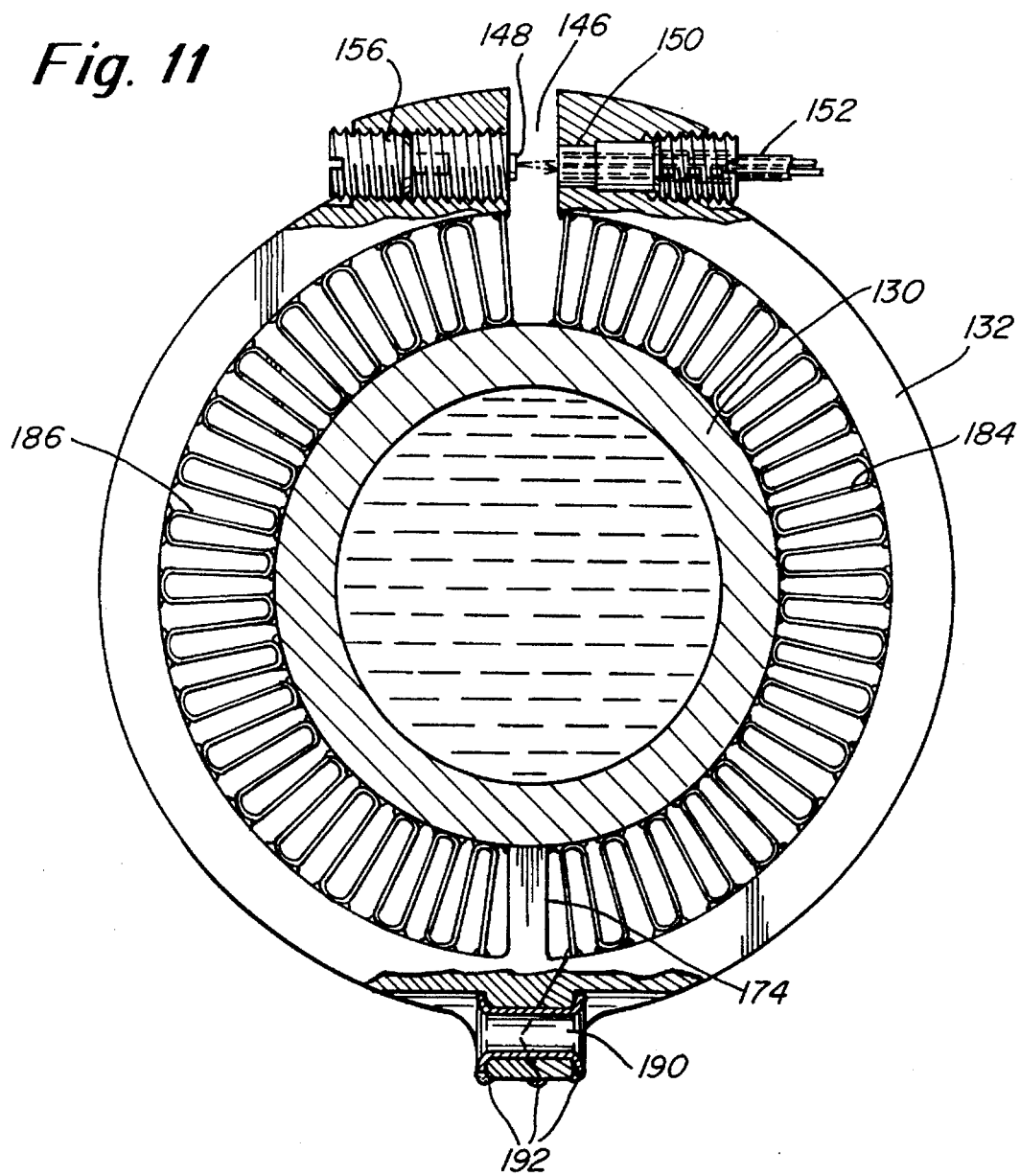
FIG. 11 is a cross-sectional view (the same view as that of FIG. 7) showing an alternate flexure arrangement.

Shown in FIG. 10 is another cross-sectional view of the transducer taken along lines 10—10 of FIG. 9. Shown in FIG. 8 are the housing 122 and body 106. The housing 122 preferably is brazed to the body 106 at braze joint 124. Also shown is the cavity 136 as well as the inner ring 130, outer ring 132 and flexure 158. The opening 146 in the outer ring also is shown with the mirror 148 attached to the outer ring on one side of the opening and the LED 150 (as well as the other optical elements described above) is attached to the outer ring on the other side of the opening. The optical fiber 152 feeds into the optical elements. Also shown is a thermocouple 180 as well as thermocouple holder 182 which provides for temperature measurements and feeds into a temperature feedback compensation circuit (not shown), as described above.

FIG. 11 is a cross-sectional view of an alternate embodiment of the transducer. The view is the same as that shown in FIG. 9. In this alternate embodiment, the transducer includes a first continuous flexure member 184 between the opening 146 (on one side thereof) and the anchor flexure 174 and a second continuous flexure member 186 between the opening 146 (on the other side thereof) and the anchor flexure 174. The flexures preferably are symmetrical about the opening. Each flexure member 184 and 186 contacts the inner and outer rings in numerous circumferential locations and preferably is brazed to both the inner ring and the outer ring at those locations.

The flexures preferably are formed from sheet metal and can be made very thin while maintaining sufficient lateral flexibility. The "ribbon candy" or ribbed flexure of this embodiment provides sufficient structural integrity to the transducer to maintain a relatively high resonant frequency thereof while at the same time, due to its thin construction provides accurate radial expansion translation. This embodiment is inexpensively constructed.

The portion below the anchor flexure 174 is shown partially cut away in cross-section. That portion includes a hollow rivet 190 brazed within the outer ring at braze joints 192. The rivet 190 adds structural integrity to that portion of the outer ring joint (joint allows it to be assembled) below the anchor flexure 174 to offer stability to the transducer during operation.

While the present invention has been described in connection with an injection molding machine, other applications are envisioned for the pressure transducer, including, but not limited to, the following:

1. The pressure transducer could replace melt transducers in extrusion applications;
2. The pressure transducer could be used to determine the rheological properties of a polymer melt or other viscous or visco-elastic fluid.
3. The pressure transducer could be used in processing plants in piping, etc.; or
4. The pressure transducer could be installed within a hot runner manifold attached to injection molds.

Having now described a limited number of embodiments of the invention, it should now be apparent to those skilled in the art that numerous other embodiments and modifications thereof are contemplated as falling within the scope of the present invention as defined by the appended claims and their equivalents.

What is claimed is:

1. A pressure transducer comprising:

a body;

an inner ring, coupled to the body, through which molten material flows, the inner ring expanding in response to pressure from the molten material;

an outer ring, coaxial with the inner ring; and at least one flexure, connecting the inner and outer rings, that translates the expansion of the inner ring to the outer ring;

wherein the body includes a cavity within which the outer ring is located.

2. A pressure transducer as claimed in claim 1 wherein a cross-section of the cavity is trapezoidal in shape.

3. The pressure transducer as claimed in claim 1 wherein the body has tapered side walls which define the cavity.

4. The pressure transducer as claimed in claim 1 further including a housing, attached to the body, that encloses the cavity.

5. The pressure transducer as claimed in claim 4 wherein an outer surface of the inner ring defines an inner wall of the cavity and an inner surface of the housing defines an outer wall of cavity, and wherein the length of the outer wall is greater than the length of the inner wall.

6. The pressure transducer as claimed in claim 4 wherein the housing is brazed or welded to the body.

7. The pressure transducer as claimed in claim 1 wherein the body is integral with the inner ring.

8. A pressure transducer comprising:

a body;

an inner ring, coupled to the body, through which molten material flows, the inner ring expanding in response to pressure exerted thereon by the molten material;

an outer ring, coaxial with the inner ring; and a plurality of flexures of varying thicknesses connecting the inner and outer rings, wherein the flexures translate expansion of the inner ring to the outer ring.

9. The pressure transducer as claimed in claim 8 wherein the outer ring includes an opening and wherein thicknesses of the flexures increase as the distances of the flexures from the opening along a circumference of the outer ring increase.

10. The pressure transducer as claimed in claim 9 further including means, coupled to the outer ring, for determining displacement of the outer ring about the opening.

11. The pressure transducer as claimed in claim 10 wherein the means for determining includes an optical circuit.

12. The pressure transducer as claimed in claim 8 wherein the flexures are substantially symmetrically disposed about the opening.

13. The pressure transducer as claimed in claim 8 wherein multiple flexures are integral with one another.

14. The pressure transducer as claimed in claim 8 including an anchor flexure disposed substantially diametrically opposite the opening, the anchor flexure being the thickest flexure.

15. A pressure transducer comprising:

a body;

an inner ring, coupled to the body, through which molten material flows, the inner ring expanding in response to pressure exerted thereon by the molten material;

an outer ring, coaxial with the inner ring; and at least one continuous flexure member connecting the inner and outer rings in a plurality of circumferential locations, wherein the at least one flexure member translates expansion of the inner ring to the outer ring.

16. The pressure transducer as claimed in claim 15 wherein the at least one flexure member is ribbed.

17. The pressure transducer as claimed in claim 15 further including an anchor flexure disposed approximately diametrically opposite an opening in the outer ring and first and second continuous flexure members disposed on opposite sides of the opening between the opening and the anchor flexure.

18. A method for forming a pressure transducer comprising the steps of:

providing a body;

forming a hollow inner ring, coupled to the body, through which molten material can flow, such that the inner ring will expand in response to pressure from the molten material;

defining a cavity within the body;

disposing an outer ring within the cavity that is coaxial with the inner ring; and connecting the inner and outer rings with at least one flexure that will translate the expansion of the inner ring to the outer ring.

19. The method as claimed in claim 18 wherein the step of defining includes defining a cavity with a trapezoidal-shaped cross-section.

20. The method as claimed in claim 18 wherein the step of forming includes forming an inner ring that is integral with the body.

21. The method as claimed in claim 18 wherein the step of defining includes defining tapered walls within the body which extend to the inner ring.

22. The method as claimed in claim 18 further including the step of attaching a housing to the body that encloses the cavity.

23. The method as claimed in claim 18 wherein the step of connecting includes connecting a plurality of flexures having varying thicknesses.

24. The method as claimed in claim 18 wherein the step of connecting includes connecting at least one continuous flexure that contacts the inner and outer rings at multiple circumferential locations.

25. The method as claimed in claim 18 wherein the step of connecting includes connecting two continuous flexures that are disposed on either side of an opening in the outer ring and that contact the inner and outer rings in multiple circumferential locations.

26. A pressure transducer comprising:

a body having a bore through which fluid material, the pressure of which is to be sensed, can flow, the bore extending between opposite ends of the body; and a pressure sensing element adapted to sense the pressure of the material that flows through the bore, wherein the body has a cavity at least in part defined by a relatively thin pressure responsive inner wall having an inner side defined by the bore, the inner wall being adapted to deflect in response to the pressure exerted on the inner side by the material in the bore, the pressure sensing element being coupled to the inner wall and adapted to respond to deflections of the inner wall.

27. The pressure transducer as claimed in claim 26, wherein the cavity is further defined by opposing sidewalls extending in a radial direction from the inner wall toward an outer surface of the body, the sidewalls being spaced from each other to establish a cavity length that extends parallel to the bore.

28. The pressure transducer as claimed in claim 27, wherein the sidewalls are nonparallel to each other so that the cavity length varies in the radial direction.

29. The pressure transducer as claimed in claim 28, wherein the sidewalls are tapered to diverge away from each other and toward the opposite ends of the body in the radial direction so that the cavity length increases in the radial direction.

30. The pressure transducer as claimed in claim 29, wherein the cavity has a trapezoidal cross-section.

31. The pressure transducer as claimed in claim 26, wherein the inner wall is comprised of an annular ring.

32. The pressure transducer as claimed in claim 31, wherein the cavity surrounds the bore.

33. The pressure transducer as claimed in claim 26, wherein the pressure sensing element is disposed completely within the cavity.

34. The pressure transducer as claimed in claim 26, further comprising a housing attached to the body and adapted to enclose the cavity.

35. The pressure transducer as claimed in claim 26, wherein the cavity is further defined by a sidewall extending in a radial direction from the inner wall toward an outer surface of the body, the sidewall being spaced from the pressure sensing element to establish a void in the cavity.

36. The pressure transducer as claimed in claim 35, wherein the void has a void length between the sidewall and the pressure sensing element that extends parallel to the bore and varies in the radial direction.

37. The pressure transducer as claimed in claim 36, wherein the void length increases in the radial direction.

\* \* \* \* \*